United States Patent [19]
Bennett et al.

[11] 3,750,473
[45] Aug. 7, 1973

[54] ALTIMETERS

[75] Inventors: John Theodore George Bennett, Romsey; John Anthony Read, Southampton, both of England

[73] Assignee: Kollsman Instrument Limited, Southampton, England

[22] Filed: Mar. 4, 1971

[21] Appl. No.: 120,878

[30] Foreign Application Priority Data
Mar. 17, 1970 Great Britain.................. 12,825/70

[52] U.S. Cl. ................................................ 73/387
[51] Int. Cl. ............................................ G01l 7/14
[58] Field of Search...................... 73/386, 387, 384; 250/231 R, 231 SE; 346/31, 33

[56] References Cited
UNITED STATES PATENTS
2,024,313  12/1935  Urfer..................................... 73/387
3,353,408  11/1967  Daleo.................................... 73/387
2,265,149  12/1941  Crane et al. ..................... 250/231 R
3,513,708   5/1970  Springer................................ 73/384

Primary Examiner—Donald O. Woodiel
Attorney—E. Manning Giles and J. Patrick Cagney

[57] ABSTRACT

An aircraft altimeter which provides a signal indicative of altitude represented in coded form. The altimeter includes an indicator dial, one or more pointers driven by a pointer shaft, and an evacuated capsule coupled to the pointer shaft via a linkage and differential gear mechanism associated with a main shaft cooperating with the linkage such as to effect rotation of the pointer shaft in response to changes in atmospheric pressure with altitude. An encoder disc, which has opaque and non-opaque portions in coded form, is mounted on the main shaft and a light source arranged to direct light on to the disc together with sensing means responsive to the light passing through the disc provide a coded signal representation of the movement imparted to the pointer shaft.

3 Claims, 4 Drawing Figures

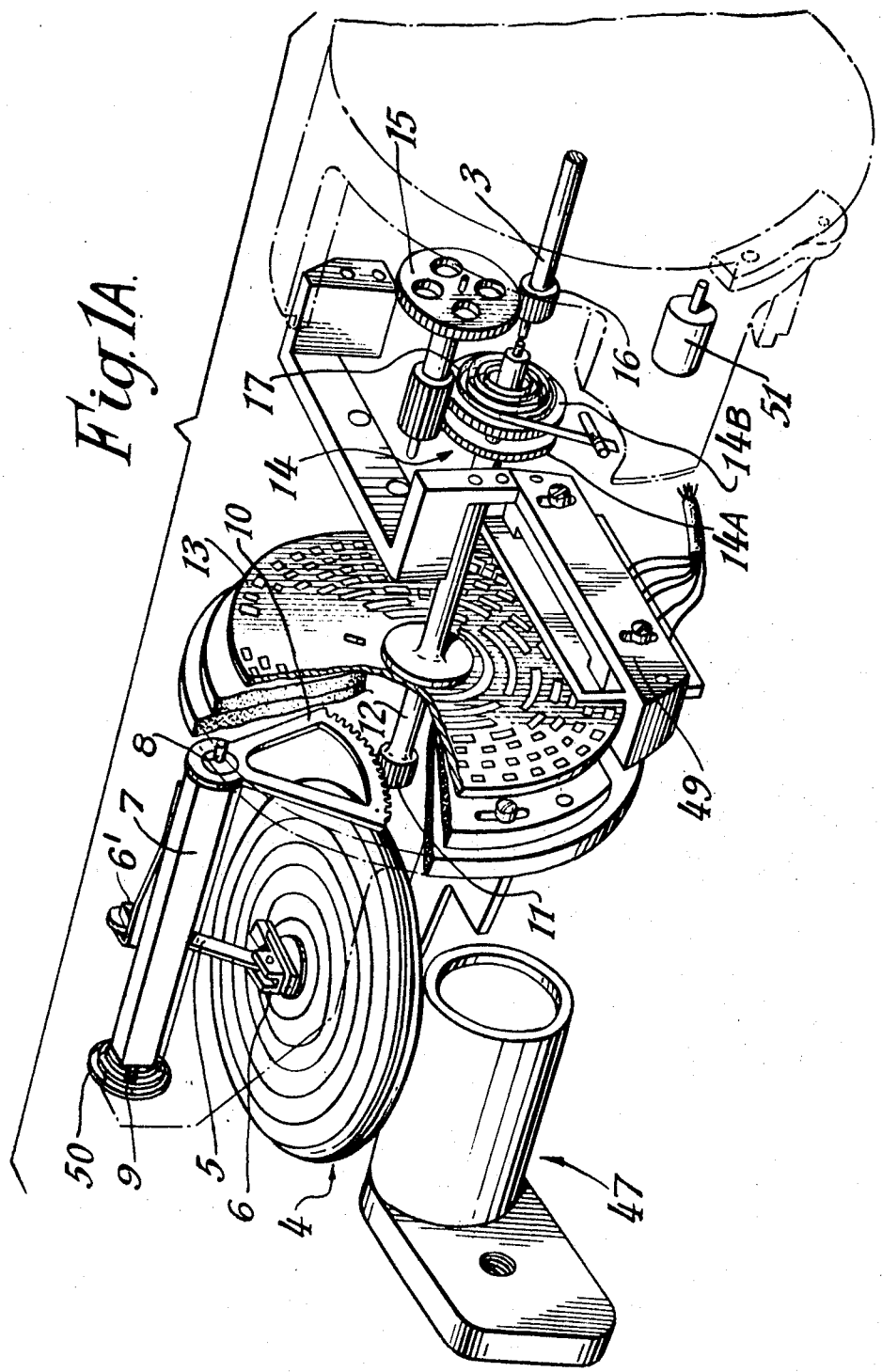

INVENTORS
JOHN THEODORE GEORGE BENNETT
JOHN ANTHONY READ

BY J. Patrick Cagney
ATTORNEY

ALTIMETERS

This invention relates to aircraft altimeters and particularly to a barometric altimeter for aircraft applications which is arranged to measure variations in atmospheric pressure during flight, such that by reference to an assumed pressure/altitude characteristic, the altitude of the aircraft above a predetermined datum level is indicated.

An object of the present invention is to provide in addition to the altitude indication, an electrical signal indicative of altitude represented in a coded form suitable for operating airborne signal transmitting apparatus such that the altitude of the aircraft can be relayed to a ground station.

According to the present invention, there is provided an aircraft altimeter including an indicator dial, at least one pointer driven by a pointer shaft, means for effecting rotation of the shaft in response to changes in atmospheric pressure with altitude comprising an evacuated capsule coupled to the shaft via a linkage and differential gear mechanism associated with a main shaft cooperating with said linkage, an encoder disc mounted on said main shaft and having opaque and non-opaque portions in coded form, a light source arranged to direct light on to said disc and sensing means responsive to the light passing through the disc to provide a coded signal representation of the movement imparted to the pointer shaft.

In the present invention, tha altimeter reading can be adjusted by means of a setting knob to compensate for changes in ground atmospheric pressure such that the altitude displayed on the instrument is with reference to any selected pressure datum. However, if required, the encoded altitude representation can be with reference to a standard pressure setting or any other setting different from that used in connection with the setting displayed.

In a preferred embodiment of the invention, the capsule movement is translated into rotary movement of the rocker shaft and gear segment by the linkage interconnecting the capsule and rocker shaft. The gear segment co-operating with a pinion of the main shaft transmits the motion to the main shaft and encoder disc and to the pointer shaft and pointers by way of the differential gearbox mounted on the baro-gear wheel. Differential gear motion independent of capsule movement may also be effected by rotation of the baro gear wheel to change altitude indication in order to compensate for variations in the barometric pressure.

It is one of the major problems with baroset altimeters to arrange for the digitised output to be referenced to standard pressure whilst the display is referenced to baroset pressure. The normal method of baroset insertion is by means of angular adjustment of the capsule assembly to provide the desired pressure. This method is clearly unusable without complex techniques to 'back-off' the barosetting in the encoded output. In the present invention, the provision of the differential gearbox between the encoder disc and altitude display comprised of the pointers and indicator panel simplifies the referencing technique. The only problem involved is that the baroscale is referenced to a standard pressure whilst the baro gearbox operates on motion linear with altitude. This problem is overcome in the present invention by employing a baroset display in which the graduations are linear with pressure, whilst the motion is linear with altitude. The graduations are thus non-linear in such a sense as to duplicate the standard pressure/height law. Thus, when an operator moves to a baroset display of a given pressure, the baroset mechanism moves by an amount corresponding to the relative altitude to that pressure change and thus the baroset gearbox is linear.

The invention will now be described by way of example only with particular reference to the accompanying drawings, wherein:

FIGS. 1A and 1B show a detached perspective view of the altimeter according to the invention;

Figure 1B:
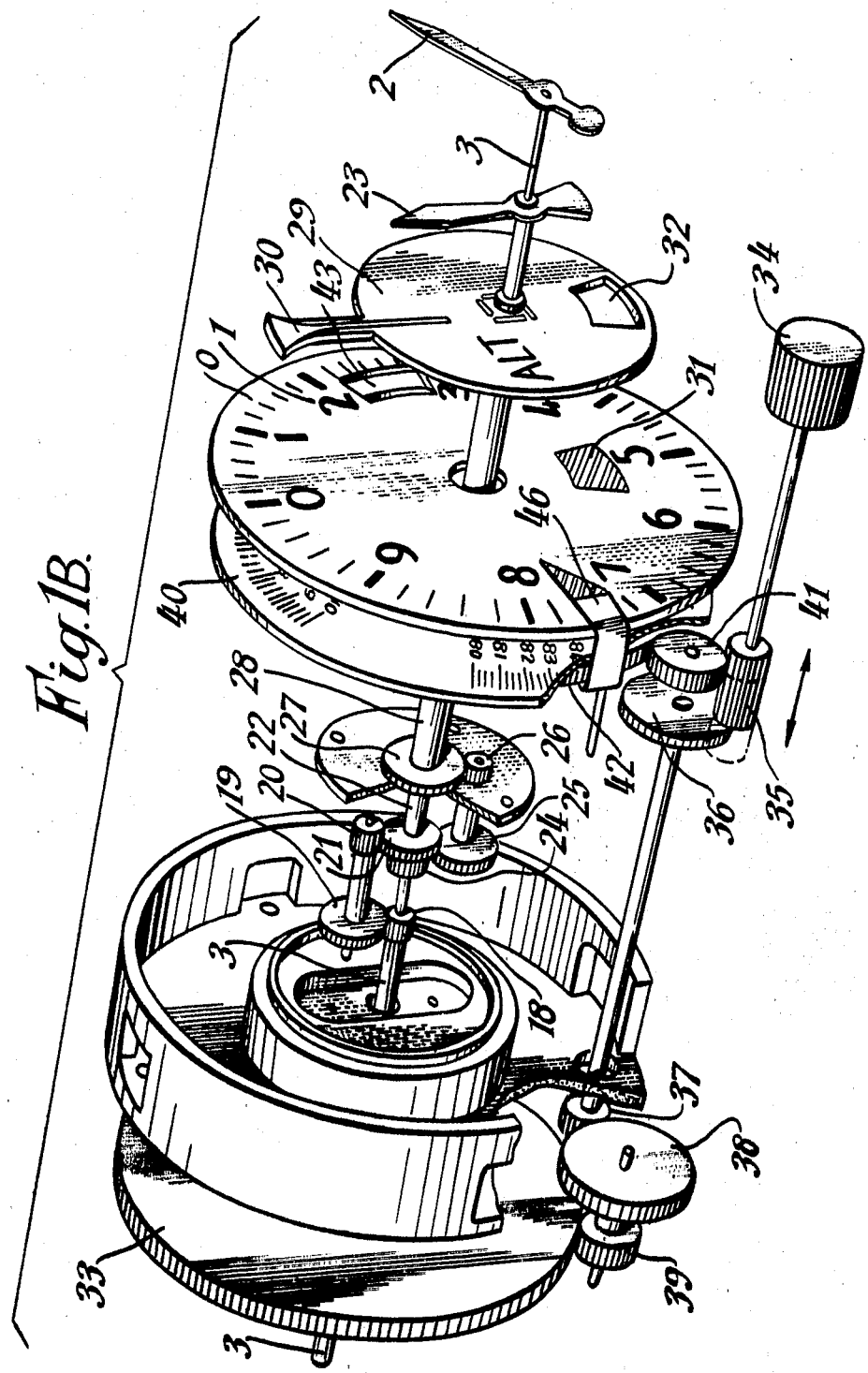
Figure 2:
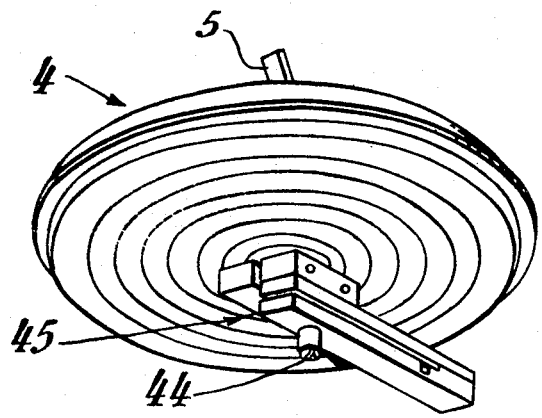
FIG. 2 is a perspective view of the capsule with means for adjustment of drift and FIG. 3 is a perspective view of the altimeter showing the dial and casing with the cover plate removed to show an access to allow external adjustment to be made for capsule drift.

Referring to FIGS. 1A and 1B, the dial 0 is calibrated in 10 increments of 100 feet, as indicated by indicia 1. The hundreds dial has a pointer 2 mounted on a shaft 3, which is rotated in response to movement of an evacuated capsule 4, (FIGS. 1A, 1B and 2). A link 5 is coupled at its lower end to an adjustable temperature compensating bimetallic member 6 which is fitted to the capsule 4 and arranged for zero compensation. The link 5 has a further bimetallic member 6' at its upper end. The member 6' is a range compensator and is non-adjustable. The member 6 is secured to a rocker shaft 7 rotatable on pivots 8, and 9, and the shaft 7 has rigidly secured thereto a gear segment 10 arranged to mesh with pinion 11.

When the altitude of the aircraft increases, the pressure decreases and the capsule 4 expands to move link 5 and effect rotation in one direction of rocker shaft 7 and gear segment 10, and the reverse movement will occur as the aircraft loses height. The movement of gear segment 10 will effect rotation of pinion 11 to turn shaft 12 on which optical encoding disc 13 is mounted. An extension of shaft 12 supports a double wheel 14 which is in train with an intermediate pinion and wheel 15, rotation of which effects rotation of shaft 3 via pinion 16. The double wheel 14 which meshes with the intermediate pinion 15 is comprised of wheel 14A fixed to the main shaft and wheel 14B free to rotate around the said shaft. Hairspring 17 attached to wheel 14B eliminates backlash between pinion 15 and wheel 14A and between segment 10 and pinion 11. Hairspring 50 eliminates backlash between rocker shaft 7, link 5 and capsule 4. Rotation of the pinion 18 on shaft 3 effects rotation of gear wheel 19 and pinion 20 to in turn effect rotation of gear wheel 21 and shaft 22 on which the pointer 23 is mounted. Pointer 23 will rotate one revolution whilst pointer 2 rotates through 10 revolutions, therefore allowing calibration in ten increments of one thousand feet each as represented by the indicia 1 on dial 0.

Rotation of pinion 24 on shaft 22 effects rotation of gear wheel 25 and pinion 26 which in turn drives gear wheel 27 and shaft 28 on which disc 29 and pointer 30 are mounted. Pointer 30 will rotate through one revolution as pointer 2 rotates through 100 revolutions thereby allowing calibration in ten increments of 10,000 feet each by the indicia 1 on dial 0. The hatched area 31 on dial 0 will be progressively exposed by the cut-out portion 32 in disc 29, as the aircraft altitude decreases below 16,500 feet, and the hatched portion will become fully exposed at zero feet. This reduces the possibility of a false altitude reading as the pointers 2, 23, become coincident.

A baro-gear plate 33 together with gear wheel 14 intermediate wheel 15 and pinion 16 comprise a differential gearbox which forms part of the barometric pressure compensation. An external baro-knob 34 is secured to a shaft carrying pinion 35 and rotation thereof effects rotation of barogear 33 via gear wheel 36, pinion 37, wheel 38 and pinion 39 meshing with the teeth of baro-gear plate 33. This in turn effects rotation of intermediate wheel and pinion 15 around pinion 16 and wheel 14 respectively as in a planetary gear system. The rotary action described above will also effect rotation of pointer shaft 3 and pointer 2. The rotation of baro-knob 34 will also rotate baro-dial 40 via pinion 35 and gear wheels 41, 42. The reading of baro-dial 40 will be visible through cut-out 43 in dial 0. The altitude reading may thus be changed manually to compensate for variations in barometric pressure by adjustment of the baro-knob 34. Baro-knob 34 may be moved axially so that pinion 35 becomes disengaged from gear wheel 36 thereby allowing baro-dial 40 only to be rotated. This may be required sometimes in order to correct the relationship between the barodial reading and the altitude reading during servicing of the instrument.

Figure 3:
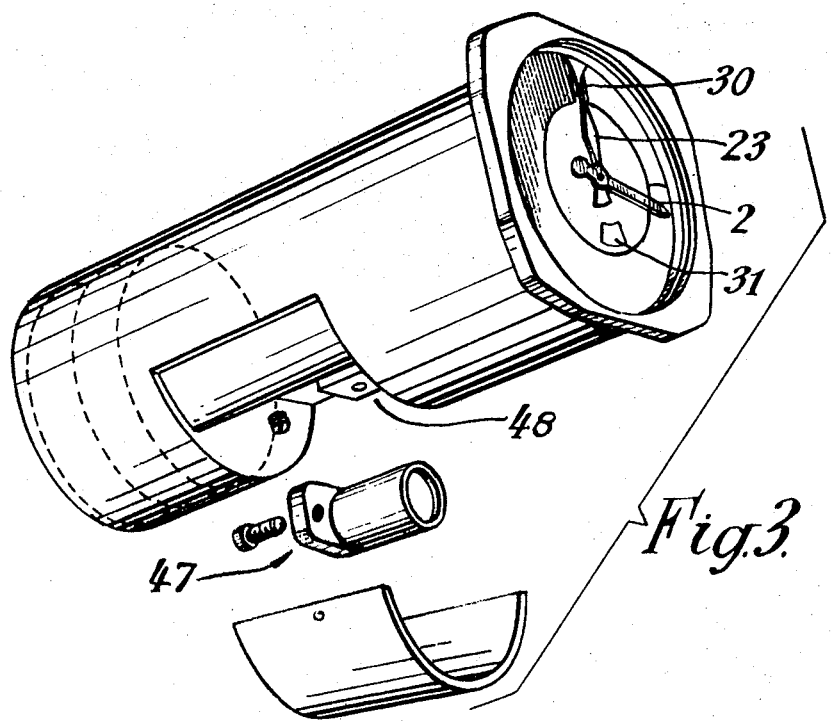

FIG. 2 shows means to compensate for capsule drift. Screw 44 is adjustable which adjusts the pressure exerted on the capsule 4 by spring 45. This in turn rotates optical disc 13 and pointer 2 following a similar action as already described for the expansion and contraction of the capsule with change in aircraft height. Thus, pointer 2 and optical encoder disc 13 are both restored to the correct altitude reading. Referring to FIG. 3 there is shown an access which allows external adjustment to be made to screw 44 for capsule drift.

The shaft 12 has mounted thereon the optical encoder disc 13. The disc 13 is manufactured from optically transparent material on to the surface of which is deposited an opaque film which is subsequently etched as shown to form alternate opaque and non-opaque portions arranged to form a digital code. A lamp assembly 47 is located in an unsealed recess external to, and adjacent the casing of the instrument as shown in FIGS. 1A and 1B, and the light from the lamp of the assembly 47 is collimated and directed through a glass window (FIG. 3) sealed into the casing wall, on to a bank of photocells 49. The coded disc 13 is interposed between the lamp and the photocells 49 such as to cut-off or allow light to fall onto the cells 49 in accordance with the coded representation of the opaque and non-opaque portions of the disc. When illuminated, each photocell 49 produces an electrical signal which is amplified and processed within an electronic module located within the casing of the altimeter. In the dark state, each photocell 49 produces a negligible signal output and in this manner binary 0 and binary 1 coded signals can be generated by the module in accordance with the signal level generated by each photocell. The output signals from the photocells are processed and amplified in an associated electronic unit to provide a signal output to meet the requirements of the particular application of the instrument.

Alignment marks are inscribed on an unused sector of the encoder disc 13 to facilitate the mutual alignment of the photocells 49 and the tracks of the disc 13. The assembly of the disc 13 on the respective shaft 12 is performed such as to eliminate eccentricities and thus altitude errors in the encoder output. A compensation track is provided on disc 13, which compensates the other tracks by altering the electronic reference levels for variation such as in lamp intensity or cell ambient conditions. A signal from a cell responsive to the light from the compensation track, can be used to indicate lamp failure by energising solenoid 51. Any failure in the lamp or encoding system is indicated to the pilot by the operation of a flag 46 by solenoid 51 on the dial.

As shown in FIG. 3, the lamp aperture 48 is formed in the casing of the altimeter and the casing is sealed with a flat piece of parallel sided glass and all lenses are external thereby eliminating any distortion during pressure changes.

Referring to the lamp assembly, the light source is housed external to the casing as hereinbefore described, and is easily interchangeable. The light source may be a filament bulb which provides a greater light output than a solid state light source. The heat dissipation by the bulb is kept external to the altimeter mechanism and does not affect the temperature characteristics of the sensitive capsule 4. The light is under direct control and is not allowed to stray as the lamp is encased externally in a black shield and not inside the casing where reflectivity problems may occur. The optical system is designed to facilitate easy replacement of lamps and no delicate positioning of the lamp is required to obtain optical calibration and this can easily be done without any form of adjustment.

Reverting to the adjustment screw 44 for compensating for capsule drift, this screw also provides a very simple means for accurately setting up the encoder disc 13. By movement of the adjustment screw 44, the capsule may be moved to rotate the encoder disc 13 through link 5, rocker shaft 7 and gear segment 10. This movement in turn rotates pointer shaft 3 and pointer 2 via the differential gears 14, 15, 16. Thus, both the encoding output and the pointer can be adjusted simultaneously. Furthermore, if the pointer 2 is not in step with the encoding output from encoding disc 13, the baro-knob 34 may be rotated for pointer 2 indication only as already described. Also, if the relationship between pointer 2 and baro-dial 40 is not correct, the external baro-knob can be pulled axially as already described. It can now be appreciated that these adjustments can readily be made externally by use of the screw 44 through access plug 50 and baro-knob 34. This allows a certain amount of calibration to be effected without removing mechanism from the casing and greatly reduces the assembly effort.

The invention is susceptible to considerable modification and is not to be deemed limited to the particular features described and shown by way of example only. For instance, although the altimeter has been described as calibrated in feet, it can also be calibrated in other increments of altitude such as yards, metres, etc. The appropriate gearing changes to effect these measurements can be made without affecting the principles described above. In certain applications, other numerical systems may be required, and the present invention can be adapted to meet the requirements. Furthermore, the encoder disc can be coded to provide any required form of digital or analogue output over any required range. For purposes of illustration only, the invention has been described with reference to a three pointer altimeter display, but the invention is equally applicable to altimeters having other forms of display, such as counter pointer, counter drum pointer or drum pointer display.

In addition to the foregoing, the barosetting could be displayed by means of a decade counter providing a digital display, the height to pressure conversion previously described being accomplished with a cam following the said height/pressure law.

We claim:

1. In an altimeter having an evacuated capsule deflectable in accordance with pressure, means for converting the deflection motion of the capsule to corresponding rotary motion, and an altimeter display responsive to applied rotary motion for indicating altitude, the combination comprising first, second, and third drive trains each for transmitting rotary motion and each having an input and an output, the first of said drive trains having its input connected to be driven by the motion converting means, means responsive to the rotary motion transmitted by the first drive train for producing an electrical signal representative of altitude referenced to a predetermined pressure reference datum, the second of said drive trains having its output connected to apply rotary motion to said altimeter display, control means for selectively driving the input of the third driven train to thereby effect rotary motion transmission thereby, and differential means operatively connecting the input of the second drive train with the outputs of the first and third drive trains to effect rotary motion transmission through the second drive train in accordance with rotary motion transmitted through either of the first and third drive trains, respectively, whereby said altitude display can be adjusted through said control means to display altitude referenced to any selected pressure reference datum with the electric signal remaining referenced to the predetermined datum.

2. In an altimeter in accordance with claim 1 and further including means responsive to said control means for indicating the selected pressure reference datum, the last named means including a scale having graduations non-linearly spaced in accordance with the pressure-altitude law.

3. In an altimeter in accordance with claim 1 wherein the electric signal producing means comprises encoding means including a disc rotatable in accordance with the rotary motion transmitted through the first drive train, a light source arranged to direct light on to said disc and sensing means responsive to the light passing through the disc to provide said electric signal as a coded signal representation of the rotary motion transmitted through the first drive train.

* * * * *

UNITED STATES PATENT OFFICE
CERTIFICATE OF CORRECTION

Patent No. 3,750,473    Dated August 7, 1973

Inventor(s) John Theodore George Bennett and John Anthony Read

It is certified that error appears in the above-identified patent and that said Letters Patent are hereby corrected as shown below:

Col. 1, line 30: "tha" should be --the--;
Col. 5, line 26: "driven" should be --drive--.

Signed and sealed this 12th day of November 1974.

(SEAL)
Attest:

McCOY M. GIBSON JR.          C. MARSHALL DANN
Attesting Officer            Commissioner of Patents